(12) United States Patent
Allen et al.

(10) Patent No.: US 10,197,323 B1
(45) Date of Patent: Feb. 5, 2019

(54) EMISSIVE COMPOSITE MATERIALS AND METHODS FOR USE THEREOF

(71) Applicant: LOCKHEED MARTIN CORPORATION, Bethesda, MD (US)

(72) Inventors: Edward Henry Allen, Bethesda, MD (US); Luke Alexander Uribarri, Arlington, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 147 days.

(21) Appl. No.: 14/992,957

(22) Filed: Jan. 11, 2016

Related U.S. Application Data (60) Provisional application No. 62/103,502, filed on Jan. 14, 2015.

(51) Int. Cl.
  *F25D 5/00* (2006.01)
  *C09K 5/14* (2006.01)

(52) U.S. Cl.
  CPC . *F25D 5/00* (2013.01); *C09K 5/14* (2013.01)

(58) Field of Classification Search
  CPC .. F25D 5/00; C09K 5/14; F25B 21/00; B82Y 10/00; H01T 13/39; H01J 61/0737; H01L 23/5328
  See application file for complete search history.

(56) References Cited

U.S. PATENT DOCUMENTS

| | | | | |
|---|---|---|---|---|
| 2,842,706 A * | 7/1958 | Dobischek | ............... | H01J 1/30 313/103 R |
| 3,140,190 A * | 7/1964 | Di Lazzaro | ............. | C04B 35/52 501/96.3 |
| 3,400,015 A * | 9/1968 | Chapman | ............... | H01J 45/00 257/467 |
| 3,402,074 A * | 9/1968 | Chapman | ............... | H01J 45/00 310/306 |
| 4,019,113 A * | 4/1977 | Hartman | ................ | H01L 35/00 257/467 |
| 5,525,374 A * | 6/1996 | Ritland | ................. | B01D 29/111 427/376.1 |

(Continued)

OTHER PUBLICATIONS

J.H. Perepezko, "The Hotter the Engine, the Better," Science, Nov. 20, 2009, pp. 1068-1069, vol. 326.

*Primary Examiner* — Emmanuel Duke
(74) *Attorney, Agent, or Firm* — Morgan, Lewis & Bockius LLP (57) ABSTRACT

Electron emission from an emissive substance, such as an emissive composite material, can be employed as a heat dissipation technique and mechanism for a part subject to operational heating. Emissive composite materials containing a refractory metal matrix and a ceramic electride material in the refractory metal matrix can be utilized for this purpose. Emissive composite materials can retain the thermal stability of the base refractory metal and emit electrons upon being heated to a sufficiently high temperature. Cooling systems and associated methods can utilize a collector configured to receive electrons emitted across open space by the ceramic electride material upon heating, and a conductive pathway can allow the electrons to be returned to the emissive composite material. Accordingly, the emissive composite material and the collector define a portion of an electrical circuit.

20 Claims, 3 Drawing Sheets

(56) References Cited

U.S. PATENT DOCUMENTS

| | | | | |
|---|---|---|---|---|
| 6,190,579 | B1* | 2/2001 | Billings | B82Y 10/00 |
| | | | | 252/515 |
| 6,322,897 | B1* | 11/2001 | Borchert | B22F 3/1109 |
| | | | | 428/469 |
| 2007/0090764 | A1* | 4/2007 | Ramachandran | H01J 1/14 |
| | | | | 313/633 |
| 2008/0265774 | A1* | 10/2008 | Webster | H01J 9/02 |
| | | | | 313/587 |
| 2013/0042594 | A1* | 2/2013 | Zauderer | F02K 9/24 |
| | | | | 60/218 |

* cited by examiner

EMISSIVE COMPOSITE MATERIALS AND METHODS FOR USE THEREOF

CROSS-REFERENCE TO RELATED APPLICATIONS

This application claims the benefit of priority under 35 U.S.C. § 119 from United States Provisional Patent Application 62/103,502, filed on Jan. 14, 2015 and incorporated herein by reference in its entirety.

STATEMENT REGARDING FEDERALLY SPONSORED RESEARCH OR DEVELOPMENT

Not applicable.

FIELD

The present disclosure generally relates to thermal management and, more specifically, to methods and systems utilizing composite materials for thermal management.

BACKGROUND

Cooling in high-temperature environments can be addressed in a variety of ways. A particular cooling technique can be chosen based upon a variety of context-dependent factors such as, for example, the degree of cooling that needs to take place, the type of structure to be cooled and its geometry, and the operational environment and its various working parameters. Internal heat pipes and refrigerant or cryogenic fluid circulation represent two commonly used cooling techniques. Forced air or compressed gas flow over a surface is another common technique for heat dissipation. In some instances, ablation of a sacrificial heat shield can be an effective strategy for thermal protection of a surface.

The foregoing heat dissipation techniques can be problematic in various aspects, particularly for high-performance applications such as air and space vehicles. Internal cooling systems such as heat pipes and refrigerant circulators can add significantly to an air or space vehicle's weight, thereby diminishing its operational performance and payload-carrying capabilities. Further, the geometry of narrow aerodynamic leading edge structures (e.g., nose cones and wing tips), stagnation regions (e.g., scramjet inlets and equipment stores), and flow diverters (e.g., control surfaces and added surface roughness areas to induce turbulent transition) in such vehicles can make it difficult to provide effective cooling with internal cooling systems. In general, an aircraft's performance-to-loss ratio (e.g., lift-to-drag or thrust-to-drag) is defined by the sharpness of its leading edges. Accordingly, cooling can be a particular issue during hypersonic flight due to the sharpness of the leading edges.

Forced air or compressed gas cooling can be used for dissipation of heat from turbine blades, for example, but such cooling mechanisms can considerably increase the complexity of engine design and decrease operational performance. Ablation strategies can often represent a successful approach, particularly for atmospheric reentry applications, but this technique likewise has its limitations. In situations where a part's shape is critical to its performance, ablative heat shields are generally not a suitable approach, since the part's exterior surface changes its shape upon ablation. This can be an issue for leading edges and similar aircraft structures. Ablative heat shields may also need to be refurbished between heating cycles. Under severe thermal loads, ablative heat shields and other types of active cooling mechanisms also can saturate and not provide a desired degree of thermal protection. Finally, ablative heat shields are most effectively applied to blunt surfaces and can considerably add to a vehicle's weight, thereby impacting its operational performance and payload-carrying capabilities. The narrow geometry of aerodynamic leading edges, in contrast, makes these structures much more difficult to protect with ablative heat shields.

In view of the foregoing, advanced techniques and materials for thermal dissipation in high-performance environments would be of significant interest in the art. The present disclosure satisfies these needs and provides related advantages as well.

SUMMARY

In various embodiments, emissive composite materials are described herein. The emissive composite materials include a refractory metal matrix, and a ceramic electride material in the refractory metal matrix.

In other various embodiments, cooling systems employing an emissive composite material are described herein. The cooling systems include an emissive composite material in thermal communication with a part subject to operational heating, where the emissive composite material includes a refractory metal matrix, and a ceramic electride material in the refractory metal matrix; a collector configured to receive electrons emitted across open space by the ceramic electride material upon heating of the part and the emissive composite material; and a return conductive pathway configured to establish electrical communication between the emissive composite material and the collector.

In still other various embodiments, methods for heat dissipation are described herein. The methods include providing an emissive composite material in thermal communication with a part subject to operational heating, where the emissive composite material includes a refractory metal matrix, and a ceramic electride material in the refractory metal matrix; heating the part and the emissive composite material at or above a temperature at which a work function threshold of the ceramic electride material is exceeded and electrons are emitted therefrom; and receiving the electrons across an open space at a collector. The collector is in electrical communication with the emissive composite material via a return conductive pathway. Emission of the electrons from the emissive composite material dissipates heat from the part.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to emissive composite materials containing ceramic electride materials. The present disclosure is also directed, in part, to methods for making emissive composite materials. The present disclosure is also directed, in part, to cooling systems employing ceramic electrides. The present disclosure is also directed, in part, to cooling methods employing ceramic electrides.

As discussed above, conventional heat dissipation techniques can often be lacking when used in high-performance environments, such as the operating environments of air and space vehicles, particularly during hypersonic flight. For example, conventional heat dissipation techniques can undesirably increase a vehicle's weight and operating performance. In addition, narrow leading edge structures, such as those present in hypersonic aircraft and some space vehicles, can be difficult to cool due to their geometric configuration. As used herein, the term "leading edge" will refer to a portion of an airframe at which flow stagnation occurs. That is, a "leading edge" represents a location at which airflow divides to flow around a vehicle and the direction of the flow streamlines changes significantly.

Advanced, thermally stable metal alloys have allowed an expanded thermal range to be realized for various types of structures and operating environments. However, increased operating temperatures are currently pushing the melting point limits for even these advanced alloys. For example, metallic high-performance parts, such as engine components and aerodynamic structures, can experience creep at high operating temperatures, which can lead to decreased performance and even operational failure in some instances. Although ceramic materials can provide even higher thermal stability than metals, ceramic materials are frequently brittle and can be unacceptable from a mechanical stability standpoint. Hence, improved thermal dissipation techniques can still be highly desirable even for advanced materials.

Metal-ceramic composite materials can sometimes be used as an alternative to conventional advanced metal alloys. Such composite materials can retain the desirable operating characteristics of the base metal while having their thermal stability enhanced somewhat by the ceramic material. Even with their favorable thermal properties, metal-ceramic composite materials usually still need to be thermally managed in high-temperature environments in some manner. By themselves, conventional composite materials offer little in the way of resolving heat dissipation issues for high-performance vehicles and challenging surface geometries.

The present inventors discovered that certain types of metal-ceramic composite materials can enable a cooling paradigm that differs significantly from those referenced above. The amount of heat dissipated can exceed that possible by conventional radiative cooling techniques. In particular, the inventors discovered that by incorporating a ceramic electride material within a metal matrix, thereby forming a metal-ceramic composite material, heat dissipation characteristics can be imparted directly to the composite material itself. Due to their high melting points, refractory metals can be particularly desirable as the metal component of such composite materials. As used herein, the terms "ceramic electride" and "ceramic electride material" will refer to a substance that emits electrons upon being heated above a threshold temperature. A ceramic electride material can exhibit metallic levels of conductivity under certain threshold thermal conditions. The threshold temperature is dependent upon the work function of the ceramic electride material. As used herein, the term "work function" will refer to the electrical potential associated with removal of an electron from a surface to a point in space distant from the surface. As electrons are emitted from an object's surface, they carry energy away from the surface, thereby resulting in cooling of the surface. The term "electron transpiration cooling" will be used herein to refer to the cooling associated with removal of energetic electrons from an object's surface. Additional thermal and energetic considerations associated with electron transpiration cooling are discussed in more detail hereinbelow.

Electron transpiration cooling of an object's surface can provide a number of advantageous benefits. Foremost, the cooling effect can be entirely passive and occur innately as an object is heated to a temperature above which the emissive threshold defined by the work function is exceeded. However, even at lower operating temperatures, induced or active emission of electrons can still take place in order to provide cooling effects, as discussed in further detail below. Regardless of whether electron transpiration cooling occurs passively or actively, the composite materials of the present disclosure can still retain the desirable thermal and mechanical characteristics of the base metal alone. Moreover, objects incorporating electron transpiration cooling effects can be further thermally managed by conventional active cooling techniques, if desired, such as the exemplary heat dissipation processes discussed above. Finally, since electron transpiration cooling involves a surface phenomenon, the composite materials disclosed herein can be disposed as a surface coating over other types of high-temperature materials. Alternately, an object can be fabricated solely from a composite material containing a ceramic electride. As such, the composite materials of the present disclosure may be particularly advantageous for high-tolerance applications in which thermal ablation strategies are unsuitable. Compared to currently available non-ablative strategies, the cooling effect can be at least an order of magnitude greater than that presently attainable.

In various embodiments, emissive composite materials are described herein. As used herein, the term "emissive composite material" will refer to a metal matrix composite containing an emissive material that emits electrons upon heating above a threshold temperature. The threshold temperature is dependent, among other factors, upon the ceramic electride material's work function. In more particular embodiments, emissive composite materials of the present disclosure can include a refractory metal matrix, and a ceramic electride material in the refractory metal matrix. Suitable examples of each of these components are discussed hereinafter.

As used herein, the term "refractory metal" will refer to any metal having a melting point exceeding about 2000° C. In more particular embodiments, the term "refractory metal" will refer to any metal from Groups 4-8 of the periodic table of the elements having a melting point exceeding about 2000° C. Hence, refractory metals suitable for use in the embodiments of the present disclosure can include, for example, titanium, vanadium, chromium, zirconium, niobium, molybdenum, ruthenium, rhodium, hafnium, tantalum, tungsten, rhenium, osmium, iridium, and any alloy or combination thereof. Niobium, molybdenum, tantalum, tungsten, osmium and rhenium have particularly high melting points (>3000° C.) and may be particularly desirable. In more specific embodiments, the refractory metal may include titanium, tungsten, molybdenum, or any combination thereof In various embodiments, the ceramic electride material can have a work function of about 2.0 eV or less. Work functions of this magnitude can provide for emission of electrons at a temperature of about 1100 K or higher. At this work function threshold, the degree of electron emission may be sufficient at about 1400 K or higher to provide cooling effects exceeding radiative cooling.

In other various embodiments, the ceramic electride material can have a work function of about 2.5 eV or less. Work functions of this magnitude can provide for emission of electrons at a temperature of about 1500 K or higher. At this work function, the degree of electron emission may be sufficient at about 1700 K or higher to provide cooling effects exceeding radiative cooling.

In more particular embodiments, the ceramic electride material can constitute a ceramic clathrate containing a caged electron. Mayenite and its derivatives constitute an exemplary class of ceramic clathrates that can be suitable for use in the various embodiments of the present disclosure upon doping to introduce a caged electron into the mineral structure. One of ordinary skill in the art will understand how to conduct the doping. Mayenite is a complex calcium aluminum oxide mineral having a cage-like structure and a formula of $Ca_{12}Al_{14}O_{33}$. This mineral is also commonly referred to as monocalcium aluminate ($CaO \cdot Al_2O_3$) or dodecacalcium hepta-aluminate ($12CaO \cdot 7Al_2O_3$, also referred to as C12A7). Depending on the degree of electron doping, mayenite has a work function of about 2.4 electron volts or less, which is nearly 40% lower than that of most refractory metals. Other ceramic electrides can also be suitable alternatives to mayenite and its derivatives. For example, the ceramic electride $12SrO \cdot 7Al_2O_3$ (S12A7) is isostructural with C12A7 and can be suitable for use in conjunction with the embodiments described herein.

Figure 1:
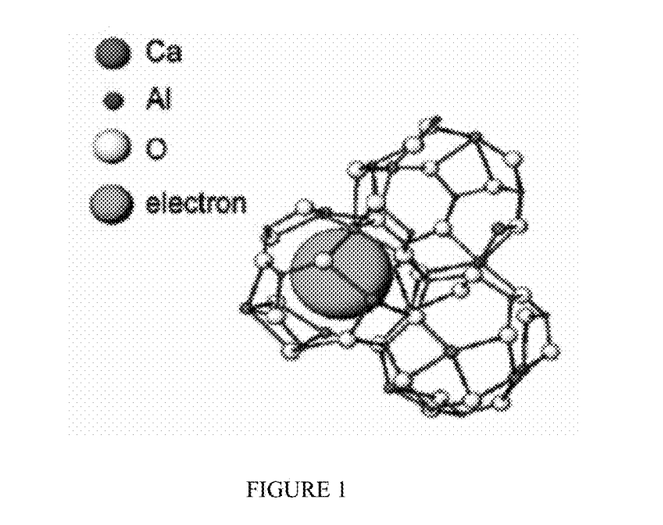
FIG. 1 shows a depiction of the structural formula of electron-doped mayenite.

FIG. 1 shows a depiction of the structural formula of electron-doped mayenite. As shown, the electron is housed within a cage containing the calcium, aluminum and oxygen atoms of the parent mineral. Although mayenite can represent a particularly desirable ceramic electride material in the embodiments of the present disclosure, it is to be recognized that other ceramic electride materials, including mayenite derivatives, can also be used in a similar manner. In illustrative embodiments, mayenite derivatives can include substances in which one or more of the cage atoms are replaced by non-native atoms. Replacement of the mayenite cage atoms can result in alteration of the work function of this substance.

A loading of the ceramic electride material in the emissive composite materials can be varied over a wide range to accommodate a desired extent of electron emission upon heating. In general, a loading of the ceramic electride material in the emissive composite materials is further constrained within a range wherein the emissive composite materials maintain desirable mechanical properties and processing capabilities, typically mimicking those of the refractory metal constituting the refractory metal matrix. In illustrative embodiments, a loading of the ceramic electride material in the refractory metal matrix can range between about 30 wt. % and about 70 wt. % of the emissive composite material. In more particular embodiments, a loading of the ceramic electride material in the emissive composite material can range between about 30 wt. % and about 50 wt. %, or between about 40 wt. % and about 60 wt. %, or between about 50 wt. % and about 70 wt. %.

In further embodiments, the emissive composite materials of the present disclosure can have a uniform or a non-uniform distribution of the ceramic electride material in the refractory metal matrix. Uniform distributions of the ceramic electride material can be desirable in terms of their relative ease of fabrication. Non-uniform distributions can be desirable in terms of their more efficient use of the ceramic electride material. In more particular embodiments, a non-uniform distribution of the ceramic electride material in the refractory metal matrix can involve a gradient distribution of the ceramic electride material in the refractory metal matrix. For example, a gradient distribution of the ceramic electride material in the refractory metal matrix can be such that a higher loading of the ceramic electride material is present on the surface of the emissive composite material than in its interior. Such a gradient distribution can facilitate electron transpiration cooling by placing a greater loading of the ceramic electride material where it may release electrons from an object's surface. In some embodiments, an emissive composite material having a gradient distribution of the ceramic electride material can lack the ceramic electride material in at least a portion of the emissive composite material. For example, a surface coating of the emissive composite material can be present upon a subsurface refractory metal object (part) lacking the ceramic electride material, such that a seamless transition is present between the object and its surface coating. Further disclosure in regard to parts formed from the emissive composite materials follows hereinafter.

In order to provide for electron transpiration cooling, a part can be fabricated with the emissive composite material coated on a surface of the part, or the part can be formed solely from the emissive composite material. When present as a surface coating, the part can be fabricated first, and the surface coating can then be applied to a desired surface of the part thereafter. The part underlying the surface coating can constitute the same refractory metal present within the emissive composite material, or it can be a different refractory metal. In either case, such a surface-coated part can be considered to have a gradient distribution of the ceramic electride material. In other embodiments, the part can be fabricated directly from the emissive composite material itself without forming a distinguishable surface coating. That is, the part can consist essentially of the emissive composite material in some embodiments of the present disclosure. By using the term "consist essentially of" in this instance, it is to be understood that any components in operable connection with the part that are not formed from the emissive composite material and/or not having a coating of the emissive composite material are not to be construed as constituting a portion of the part itself.

The emissive composite materials of the present disclosure can be prepared by any suitable technique. In illustrative embodiments, the emissive composite material can be prepared by infiltrating a molten refractory metal about a loosely consolidated network of the ceramic electride material. In illustrative embodiments, small particles of the ceramic electride material (e.g., less than about 1 mm in diameter) can be mixed into a molten plastic or other retainer material, and formed into a desired shape (e.g., through injection molding). Suitable retainer materials are not particularly limited. The retainer material can then be removed through a chemical process (i.e., solvent dissolution, calcination, oxidation, or the like), leaving the ceramic electride particles held together weakly or consolidated in a desired shape. Further sintering can optionally be conducted at this stage to increase the degree of consolidation between the ceramic electride particles. Molten refractory metal can then be injected into the resulting ceramic electride structure to afford the final composite material. In the case of an emissive composite material containing a tungsten refractory metal matrix, the tungsten refractory metal matrix provides high strength and temperature resistance, and the ceramic electride material maintains its emissivity properties in the refractory metal matrix. The electron emissivity of the emissive composite material can be greater than that of the ceramic electride material alone due to the Fowler-Nordheim principle, which provides that electrons are more readily emitted from high-field points at the interfaces between the two materials.

As indicated above, the emissive composite materials of the present disclosure can provide a cooling mechanism for various objects by shedding of electrons, which then carry energy away from the object. Emission of electrons can occur passively as the emissive composite material undergoes heating above a threshold temperature, or induced electron emission can occur at lower temperatures, as discussed further below. In order for electron transpiration cooling to take place on an ongoing basis, a supply of electrons needs to be provided to the emissive composite material to replace those lost through emission. Otherwise, the electron transpiration cooling process would cease once the initial supply of electrons is depleted. Hence, in some embodiments, the emissive composite materials of the present disclosure can be placed in an electrical circuit so that an ongoing supply of electrons can be provided to the emissive composite material. The electrical circuit can define at least a portion of a cooling system for a part upon which the emissive composite material is present. In more particular embodiments, the electrical circuit can be configured to recirculate at least a portion of the emitted electrons back to the emissive composite material to so that they can provide ongoing cooling effects.

Accordingly, cooling systems of the present disclosure can include an emissive composite material in thermal communication with a part subject to operational heating, wherein the emissive composite material includes a refractory metal matrix and a ceramic electride material in the refractory metal matrix; a collector configured to receive electrons emitted across open space by the ceramic electride material upon heating of the part and the emissive composite material; and a return conductive pathway configured to establish electrical communication between the emissive composite material and the collector. Thus, the emissive composite material and the collector define at least a portion of an electrical circuit that can return emitted electrons to the emissive composite material.

Figure 2:
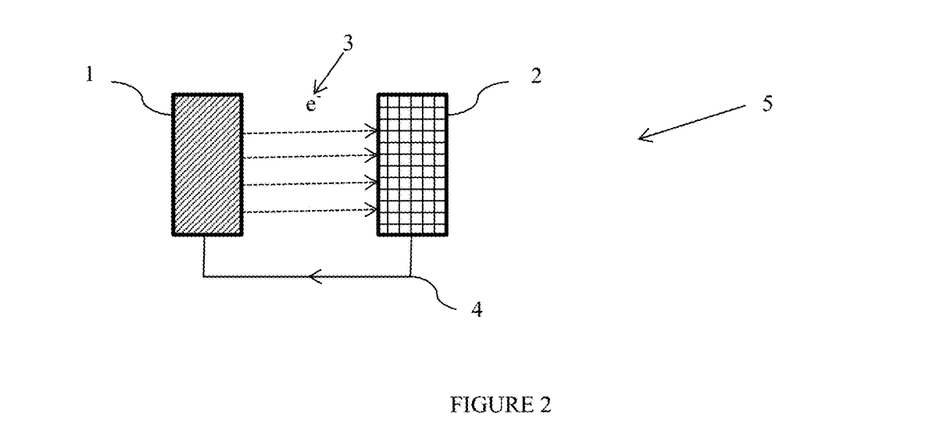
FIG. 2 shows a generalized schematic of an illustrative cooling system employing an emissive composite material.

FIG. 2 shows a generalized schematic of an illustrative cooling system employing an emissive composite material. As shown in FIG. 2, electrons 3 are emitted from part 1 containing an emissive composite material and are directed across open space toward collector 2. It is to be recognized that the shape and configuration of part 1 are arbitrary and are generalized in FIG. 2 for purposes of illustration. Part 1 can have a surface coating of the emissive composite material, or part 1 can be formed solely from the emissive composite material. More specific configurations are discussed hereinbelow. Collector 2 is likewise depicted in generalized form in FIG. 2. In general, collector 2 can be any conductive surface that can receive emitted electrons 3. Electrons 3 carry thermal energy from part 1 and can result in its cooling. Upon transference of electrons 3 to collector 2, heating of this structure can take place due to the transferred thermal energy. Whereas part 1 may be difficult to cool using conventional cooling techniques (e.g., due to its location, geometry, and/or operational considerations), collector 2 can represent a structure that is more amenable toward conventional cooling techniques. Hence, a conventional active cooling system (not shown in FIG. 2), such as a heat pipe, refrigerant or cryogenic fluid circulator, forced air circulator, or the like, can be placed in thermal communication with collector 2 to dissipate heat from its structure.

Referring still to FIG. 2, conductive element 4 establishes electrical communication between part 1 and collector 2. Hence, the configuration depicted in FIG. 2 defines circuit 5, through which electrons 3 can circulate. The direction of electron circulation is defined by the arrow orientation in FIG. 2. The circulation of electrons 3 can allow emissive composite material 1 to be continuously cooled without supplying additional electrons from an external source. Thermodynamic considerations of the electron flow within circuit 5 are considered in more detail herein below.

In some embodiments, the part being cooled by the transpiration of electrons can consist of or consist essentially of the emissive composite material. In other embodiments, the emissive composite material can constitute a surface coating upon at least a portion of the part. A part having a surface coating of the emissive composite material can include the same refractory metal as the emissive composite material, or a different refractory metal can constitute the part. In some or other embodiments, the ceramic electride material can have a gradient distribution in the refractory metal matrix of the emissive composite material, either as a surface coating on a part or when constituting at least a portion of a part.

In more particular embodiments, the cooling systems of the present disclosure can constitute a portion of an aircraft leading edge or a turbine blade. That is, such parts can be cooled under operational conditions using a cooling system employing an emissive composite material once the part is placed in an appropriate electrical circuit. Aircraft leading edges that can be cooled in this manner include, for example, nose cones and wing tips, and other locales where aerodynamic stagnation can occur. Particularly in hypersonic aircraft, these leading edge structures can present a small geometric footprint, often tapering to a sharp edge, and can be difficult to cool by conventional cooling techniques. For aircraft leading edges and turbine blades, the body of the aircraft or engine can, in some embodiments, define at least a portion of the electrical circuit returning electrons to the emissive composite material.

Figure 3:
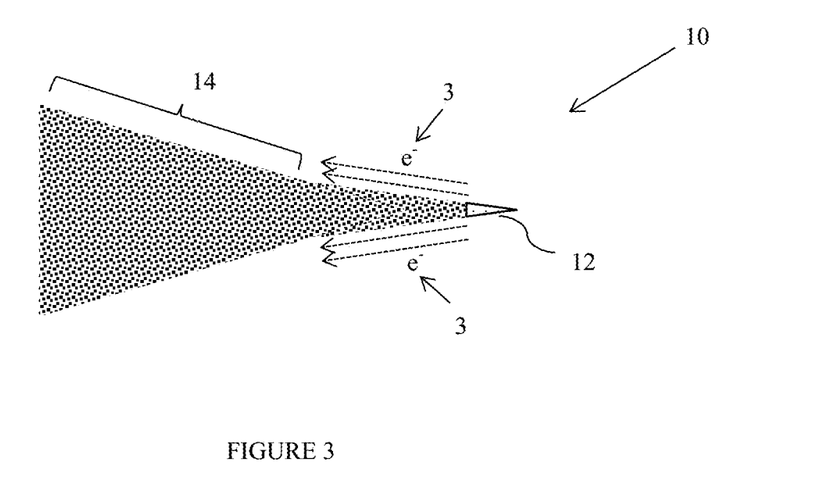
FIG. 3 shows an illustrative schematic of a hypersonic aircraft with a leading edge incorporating an emissive composite material.

FIG. 3 shows an illustrative schematic of a hypersonic aircraft with a leading edge incorporating an emissive composite material. As shown in FIG. 3, hypersonic aircraft 10 contains leading edge 12, which includes at least a surface coating of the emissive composite material of the present disclosure. During hypersonic flight, leading edge 12 undergoes frictional heating, and upon reaching a threshold temperature, electrons 3 are emitted in a region of hypersonic shock. Electrons 3 travel through the region of hypersonic shock and eventually contact body 14 of hypersonic aircraft 10. Body 14 can include an electrical conductor which allows the electrons to flow back to leading edge 12, thereby defining an electrical circuit. In some embodiments, the entirety of body 14 can include the electrical conductor, and in other embodiments, a conductive element (e.g., wiring) can be disposed within body 14 to carry electrons 3 back to leading edge 12.

As indicated above, the collector receiving the electrons emitted by the ceramic electride material can have a shape that is more amenable to active cooling techniques than is the part from which the ceramic electride material dissipates heat. Illustrative shapes for the collector can include those that, for example, have a greater radiative surface area or thermal mass than the part in thermal communication with the emissive composite material. For example, the collector can include a planar surface or like large-area surface, such as a hemispherical collector. In hypersonic aircraft applications, the collector can be conformal to the outer mould line of the vehicle. Hence, conventional cooling techniques can be applied to the collector to dissipate the excess heat deposited there by the emitted electrons.

At lower operating temperatures, the emission threshold of the work function of the emissive composite material may not be exceeded to a significant degree, thereby precluding electron transference across open space between the emissive composite material and the collector. In such instances, an electric field can be applied to the collector to lower the energy barrier for transference of the electrons. Although the electron transfer process is no longer entirely passive in this configuration, the application of an electric field to promote electron transfer is still desirable in situations where other cooling techniques are inapplicable. Suitable techniques for applying an electric field to the collector are not considered to be particularly limited and will be understood by one having ordinary skill in the art.

Accordingly, in still other embodiments, the present disclosure provides methods for cooling a part using an emissive composite material. In various embodiments, such methods can include: providing an emissive composite material in thermal communication with a part subject to operational heating, wherein the emissive composite material includes a refractory metal matrix and a ceramic electride material in the refractory metal matrix; heating the part and the emissive composite material at or above a temperature at which a work function threshold of the ceramic electride material is exceeded and electrons are emitted therefrom; and receiving the electrons across an open space at a collector. Emission of the electrons from the emissive composite material dissipates heat from the part. The collector is in electrical communication with the emissive composite material via a return conductive pathway. Thus, upon receiving the emitted electrons at the collector, the electrons can return to the emissive composite material by way of the return conductive pathway to allow continued electron transpiration cooling to take place.

In further embodiments, cooling methods of the present disclosure can further include actively cooling the collector while the electrons are being received thereon and/or applying an electric field to the collector while the electrons are being received thereon. As discussed above, active cooling can dissipate heat transferred to the collector by the electrons, and application of the electric field can promote electron transference when the temperature is too low to exceed the work function threshold to a significant degree.

EXAMPLES

The following discussion presents a mathematical analysis of the electron transpiration cooling principles described hereinabove.

The emission current density from a surface is governed by the Richardson equation (Formula 1), $$J = AT^2 e^{-\phi/T} \quad \text{(Formula 1)}$$

in which J is the emission current density, A is a constant having a value of $1.2 \times 10^6$ A·m$^{-2}$K$^{-2}$, T is the temperature, and $\phi$, is the work function. In the exponential portion of Formula 1, $\phi$, and T have compatible units, such as electron volts. The temperature in Kelvin can be converted into equivalent electron volt energy units by applying the relationship of Formula 2.

$$1 \; eV = 11604.5 \; K \quad \text{(Formula 2)}$$

The power carried by the emitted electrons during electron transpiration cooling is then defined by Formula 3, $$P_{ETC} = J\phi \quad \text{(Formula 3)}$$

in which $P_{ETC}$ is the power produced upon electron transpiration cooling. In contrast, the power generated during radiative cooling is defined by the Stefan-Boltzmann equation (Formula 4), $$P_{RAD} = \sigma T^4 \quad \text{(Formula 4)}$$

in which $P_{RAD}$ is the power produced upon radiative cooling, T is the temperature and $\sigma$ is a constant having a value of $5.67 \times 10^{-8}$ W/K$^4$.

In order for electron transpiration cooling to provide a more effective cooling process than radiative cooling, $P_{ETC}$ needs to be greater than $P_{RAD}$. Equivalently, the ratio $P_{ETC}/P_{RAD}$, defined by the symbol $\gamma$, needs to be greater than unity, as expressed in Formula 5.

$$\gamma = \frac{P_{ETC}}{P_{RAD}} \sim \frac{2 \times 10^{13} \phi}{T^2} e^{-\phi/T} \quad \text{(Formula 5)}$$

Figure 4:
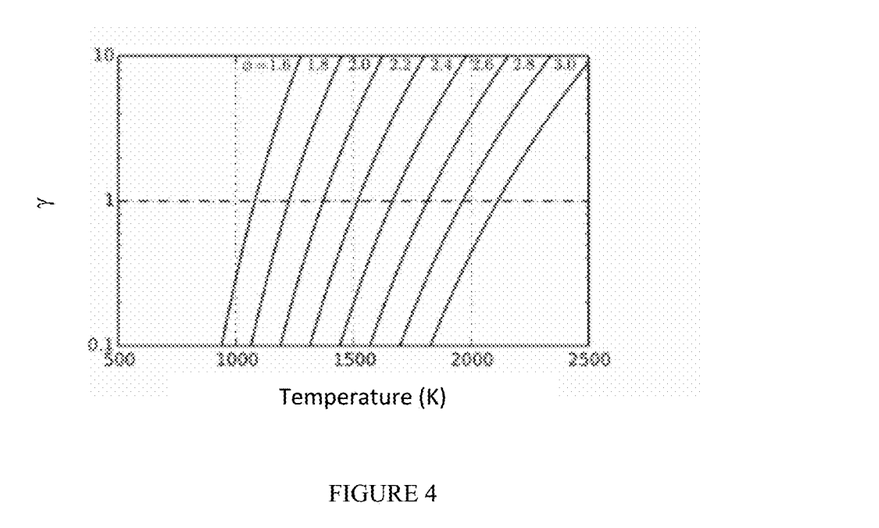
FIG. 4 shows an illustrative plot of the variance of the ratio $P_{ETC}/P_{RAD}$ as a function of temperature for several different work function values.

FIG. 4 shows an illustrative plot of the variance of the ratio $P_{ETC}/P_{RAD}$ as a function of temperature for several different work function values. As shown in FIG. 4, for work functions in the range of 1.6 eV to 3 eV, the power ratio $\gamma$ exceeds unity over a range of about 1100-2150 K. Such temperatures are commonly encountered during hypersonic flight.

Electrons impinging upon a collector deposit an amount of power that is largely equivalent to that expressed by Formula 3, with the work function of the collector being replaced by that of the emitter. Provisions to dissipate this power can be taken into account in the cooling system's design.

As electrons flow back to the emissive composite material from the collector, Joule heating takes place due to the resistivity of the material forming the return conductive pathway. As an approximation of the Joule heating that takes place, one may consider a rod of cross-sectional area A, length l, resistivity $\rho$, and work function $\phi$ that is constrained to emit electrons exclusively from its end face (i.e., the end of the rod). For a current density J, the ratio $\beta$ of the total heat flow out of the rod to the total heat generated within the rod can be expressed by Formula 6, $$\beta = \frac{q_{ETC}}{q_J} = \frac{J\phi A}{\rho J^2 A l} = \frac{\phi}{\rho J l} = \frac{\phi}{\rho \left(\frac{I}{A}\right)\left(\frac{RA}{\rho}\right)} = \frac{\phi}{RI} \quad \text{(Formula 6)}$$

in $q_{ETC}$ is the heat removed upon electron transpiration, $q_J$ is the Joule heat, I is the current and R is the resistance.

When β is greater than unity, the heat removed by electron transpiration exceeds the heat generated upon return current flow. The relationships I=JA and R=ρl/A were substituted for J and l in Formula 6 to express this formula in terms of current and resistance.

Figure 5:
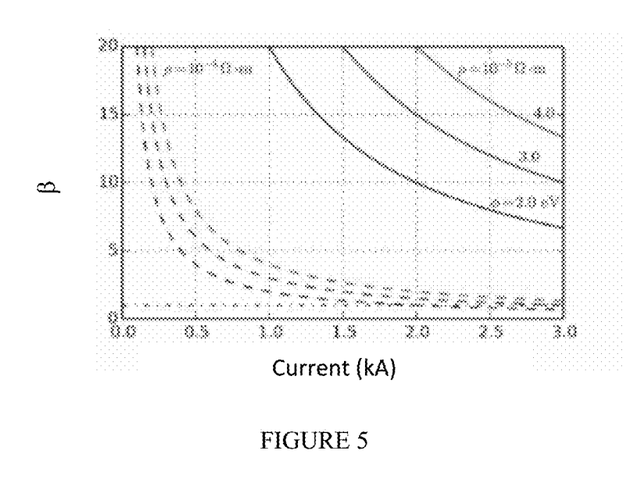
FIG. 5 shows an illustrative plot of the variance of the ratio $q_{ETC}/q_J$ as a function of current for several different work function values.

FIG. 5 shows an illustrative plot of the variance of the ratio $q_{ETC}/q_J$ as a function of current for several different work function values. The resistivity value was varied over a range of $10^{-4}$-$10^{-5}$ Ω·m at an aspect ratio (l/A) of 10. As shown in FIG. 5, the ratio β lies above unity in the kiloamp range for resistivity and work function values of relevance. For practical materials contemplated for use in hypersonic flight, reasonable resistivity values typically lie in a range of approximately $10^{-5}$-$10^{-7}$ Ω·m, thus making the value of ratio β negligibly small. Hence, Joule heating appears to be of insignificant concern during electron transpiration cooling.

Finally, as the electrons return to the emissive composite material, they encounter one or more material interfaces. For example, electrons travelling through a return conductive pathway to the emissive composite material encounter a material interface between the conductive material of the return conductive pathway and the emissive composite material. Regardless of the material interface's nature, the returning electrons either have to climb an energy level or fall down an energy level as they reenter the emissive composite material. In the case of the electrons climbing an energy level, cooling of the material interface occurs, and in the case of the electrons dropping an energy level, heating of the material interface occurs. The latter is the well-known Peltier effect. The degree of Peltier heating qp at the material interface can be expressed by Formula 7, $$q_P = (\pi_A - \pi_B)J = (S_A - S_B)TJ \quad \text{(Formula 7)}$$

in $P_A$ and $P_B$ are the Peltier coefficients for the first and second materials constituting the material interface, and $S_A$ and $S_B$ are the corresponding Seebeck coefficients. Using the relationship π=TS allows Formula 7 to be expressed in terms of the corresponding Seebeck coefficients. Accordingly, the ratio ψ of the heat removed during electron transpiration cooling compared to that generated by Peltier heating (i.e., $q_{ETC}/q_p$) can be expressed by Formula 8, $$\psi = \phi/\Delta ST \quad \text{(Formula 8)}$$

in which ΔS is the difference in the Seebeck coefficients of the materials constituting the material interface and the other variables are defined as above. Accordingly, when ψ is greater than unity, the heat removed by electron transpiration exceeds the heat generated by Peltier heating. With a typical value of ΔS being on the order of 0.1 mV/K, the ratio φ/ΔS is on the order of 10,000. Hence, for temperatures below approximately 10,000 K, the degree of Peltier heating does not exceed the degree of electron transpiration cooling.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. An emissive composite material comprising:
   a refractory metal matrix; and
   a ceramic electride material in the refractory metal matrix, wherein the ceramic electride material has a gradient distribution in the refractory metal matrix.

2. The emissive composite material of claim 1, wherein a loading of the ceramic electride material in the refractory metal matrix ranges between about 30 wt. % and about 70 wt. % of the emissive composite material.

3. The emissive composite material of claim 1, wherein the ceramic electride material has a work function of about 2.0 eV or less.

4. The emissive composite material of claim 1, wherein the ceramic electride material comprises mayenite or a derivative thereof.

5. The emissive composite material of claim 1, wherein a refractory metal comprising the refractory metal matrix is selected from the group consisting of titanium, vanadium, chromium, zirconium, niobium, molybdenum, ruthenium, rhodium, hafnium, tantalum, tungsten, rhenium, osmium, iridium, and any alloy or combination thereof.

6. A cooling system comprising:
   an emissive composite material in thermal communication with a part subject to operational heating;
   wherein the emissive composite material comprises a refractory metal matrix and a ceramic electride material in the refractory metal matrix;
   a collector configured to receive electrons emitted across an open space by the ceramic electride material upon heating of the part and the emissive composite material; and
   a return conductive pathway configured to establish electrical communication between the emissive composite material and the collector.

7. The cooling system of claim 6, wherein the part has at least a surface coating of the emissive composite material.

8. The cooling system of claim 6, wherein the part consists of the emissive composite material.

9. The cooling system of claim 6, further comprising:
   an active cooling mechanism in thermal communication with the collector.

10. The cooling system of claim 6, wherein the collector is configured for application of an electric field thereto while receiving electrons emitted by the ceramic electride material.

11. The cooling system of claim 6, wherein the ceramic electride material has a gradient distribution in the refractory metal matrix.

12. The cooling system of claim 6, wherein a loading of the ceramic electride material in the refractory metal matrix ranges between about 30 wt. % and about 70 wt. % of the emissive composite material.

13. The cooling system of claim 6, wherein the ceramic electride material has a work function of about 2.0 eV or less.

14. The cooling system of claim 6, wherein the ceramic electride material comprises mayenite or a derivative thereof.

15. The cooling system of claim 6, wherein the part is an aircraft leading edge or a turbine blade.

16. A method comprising:
   providing an emissive composite material in thermal communication with a part subject to operational heating;

wherein the emissive composite material comprises a refractory metal matrix and a ceramic electride material in the refractory metal matrix;

heating the part and the emissive composite material at or above a temperature at which a work function threshold of the ceramic electride material is exceeded and electrons are emitted therefrom;

wherein emission of the electrons from the emissive composite material dissipates heat from the part; and receiving the electrons across an open space at a collector, the collector being in electrical communication with the emissive composite material via a return conductive pathway.

17. The method of claim 16, further comprising:
actively cooling the collector while the electrons are being received thereon.

18. The method of claim 16, further comprising:
applying an electric field to the collector while the electrons are being received thereon.

19. The method of claim 16, wherein the part is an aircraft leading edge or a turbine blade.

20. The emissive composite material of claim 1, wherein there is a higher loading of the ceramic electride material on a surface of the emissive composite material than in an interior of the emissive composite material.

* * * * *